United States Patent
Riise et al.

(10) Patent No.: US 7,844,283 B2
(45) Date of Patent: Nov. 30, 2010

(54) METHOD OF PROVIDING LOCATION BASED INFORMATION TO A MOBILE TERMINAL WITHIN A COMMUNICATIONS NETWORK

(75) Inventors: Soren Riise, Ruislip (GB); Devesh Patel, Ruislip (GB)

(73) Assignee: Yahoo! Inc., Sunnyvale, CA (US)

( * ) Notice: Subject to any disclaimer, the term of this patent is extended or adjusted under 35 U.S.C. 154(b) by 201 days.

(21) Appl. No.: 10/861,265

(22) Filed: Jun. 3, 2004

(65) Prior Publication Data
US 2005/0003835 A1 Jan. 6, 2005

(30) Foreign Application Priority Data
Jun. 10, 2003 (GB) .................... 0313367.5

(51) Int. Cl.
*H04W 24/00* (2009.01)
(52) U.S. Cl. .............. 455/456.3; 455/456.1; 455/456.5; 455/414.2
(58) Field of Classification Search .............. 455/456.3, 455/414.2, 456.1, 404.2, 456.5
See application file for complete search history.

(56) References Cited

U.S. PATENT DOCUMENTS

| | | | | |
|---|---|---|---|---|
| 5,751,245 A * | 5/1998 | Janky et al. | ............. | 342/357.07 |
| 5,754,125 A * | 5/1998 | Pearce | ......................... | 340/989 |
| 5,919,239 A * | 7/1999 | Fraker et al. | .................. | 701/35 |
| 6,169,899 B1 * | 1/2001 | Havinis et al. | ............... | 455/433 |
| 6,516,197 B2 * | 2/2003 | Havinis et al. | ........... | 455/456.1 |
| 6,671,377 B1 * | 12/2003 | Havinis et al. | .............. | 380/258 |
| 6,750,813 B2 * | 6/2004 | Vargas-Hurlston et al. | ....... | 342/357.09 |
| 2002/0013153 A1 * | 1/2002 | Wilcock et al. | ............. | 455/456 |
| 2002/0111172 A1 * | 8/2002 | DeWolf et al. | ............. | 455/456 |
| 2002/0155844 A1 * | 10/2002 | Rankin et al. | ............... | 455/456 |
| 2003/0013459 A1 * | 1/2003 | Rankin et al. | ............... | 455/456 |
| 2003/0022676 A1 * | 1/2003 | Nakamoto et al. | .......... | 455/456 |
| 2003/0078053 A1 * | 4/2003 | Abtin et al. | ................. | 455/456 |
| 2004/0162090 A1 * | 8/2004 | Suryanarayana et al. | . | 455/456.5 |
| 2004/0202301 A1 * | 10/2004 | Elliott | ................... | 379/201.02 |
| 2004/0203852 A1 * | 10/2004 | Janakiraman | ............ | 455/456.1 |
| 2010/0035588 A1 * | 2/2010 | Adler et al. | ............. | 455/414.1 |

FOREIGN PATENT DOCUMENTS

GB 2333664 A 7/1999

OTHER PUBLICATIONS re GB0313367.5, Search Report, Nov. 13, 2003.

* cited by examiner

*Primary Examiner*—Ajit Patel
*Assistant Examiner*—Khai M Nguyen
(74) *Attorney, Agent, or Firm*—Hancock Hughey LLP

(57) ABSTRACT

A method of providing location based information to a mobile terminal within a communications network comprising the steps of interrogating a component of the communications network to determine the location of a mobile terminal within the communications network; repeating the above process a number of times over a period of time; generating, from the repeated determinations of the location of the mobile terminal within the communications network, a location profile for the mobile terminal; storing the location profile; and providing location based information to the mobile terminal in response to the location of the mobile terminal determined by the stored location profile.

11 Claims, 2 Drawing Sheets

METHOD OF PROVIDING LOCATION BASED INFORMATION TO A MOBILE TERMINAL WITHIN A COMMUNICATIONS NETWORK

TECHNICAL FIELD

This invention relates to location based information provision to mobile terminals in a communications network.

BACKGROUND

In order to provide accurate location based information and services to mobile terminal users (subscribers to a cellular communications network), a system must know where every individual subscriber is located at any given time. Whilst this sounds simple, the current architecture of a cellular communications network does not have any central useable knowledge of the location of the mobile terminals. This means that every current solution for pushing location based services to mobile terminals needs to poll the network to gather the needed information.

In the case of a cellular communications network, all location queries are routed through the GMLC (Gateway Mobile Location Centre) which is polled to provide location information derived from the network. Such polling activity to a network resource is acceptable for small scale use, for example business subscribers where the number of subscribers is in the order of thousands. However, for consumer subscribers where there may be 10 million or more subscribers, a location based information provider polling the network for location information on each of those subscribers would overload the mobile network. This polling requirement significantly limits the network population that can have a meaningful location based information push service.

It should be noted that location based services can be provided "on request" as opposed to "push" services but uptake of such request services is poor and little revenue is derived therefrom.

SUMMARY OF THE INVENTION

The present invention seeks to overcome the technical problem of overloading a network with the volume of consumer traffic demanding, by default, location based services from a network resource such as a GMLC, the gateway to mobile terminal location derived from a cellular network.

One aspect of the present invention provides a method of providing location based information to a mobile terminal within a communications network comprising the steps of: interrogating a component of the communications network to determine the location of a mobile terminal within the communications network; repeating the above process a number of times over a period of time; generating, from the repeated determinations of the location of the mobile terminal within the communications network, a location profile for the mobile terminal; storing the location profile; providing location based information to the mobile terminal in response to the location of the mobile terminal determined by the stored location profile.

Another aspect of the present invention provides a location based information system for mobile terminals in a communications network, the infrastructure comprising: a data acquisition module to determine the location of a mobile terminal within the communications network by interrogating a component of the communications network; a profile generator to analyse and create a location profile of the mobile terminal from the acquired data; and a location profile store to store the location profiles for a plurality of mobile terminals.

BRIEF DESCRIPTION OF THE DRAWINGS

In order that the present invention may be more readily understood, embodiments thereof will now be described, by way of example, with reference to the accompanying drawings, in which.

DETAILED DESCRIPTION

Human behaviour is predictable, mainly because it is repetitive: hence the location of a subscriber to a cellular network (and that of their mobile terminal, e.g. mobile telephone) is to an extent also predictable. In a consumer market it is given that more than 90% of people do the same journey to work 90% of the time. From historical information gathered for each subscriber, it is possible to predict where the subscriber is without accessing any network resources. There should preferably be a level of verification to ensure and maintain the quality of the prediction, and also elements which can cater for the remaining 10% (or less) of the population which has a less predictable, non-repetitive schedule. Using prediction only, a precondition for the provision (or push) of location based information is that the end-user service being offered is not dependent on absolute accuracy of actual position. Thus, information or services such as traffic information, travel advice, location based marketing and community applications are appropriate forms of information or service deliverable by embodiments of the invention. Emergency services (E911/E112/999) or services that involve monetary settlement are not as appropriate as they require verification of the location. Services that are appropriate without verification include travel advice, traffic information, commute car share advice, special offers (last minute deals), friend alerts and couple alerts.

This invention relates to location based information provision to mobile terminals in a communications network. The given example relates to a cellular communications network but the principle can be used in other communications networks.

In this example, a location based information system interfaces between a telecommunication network (or can comprise part of the network) and a plurality of mobile terminals each of which is owned (or leased) by a subscriber to the network. The aim of the invention is to push location based information and services to mobile terminals without overloading the component(s) of the network which can provide location information for each of the mobile terminals.

Embodiments of the invention provide a scalable service. This means that the system works in any mobile phone operators' network, ranging from a small operator with 300 k subscribers, to large networks with 10M to 20M subscribers.

Figure 1:
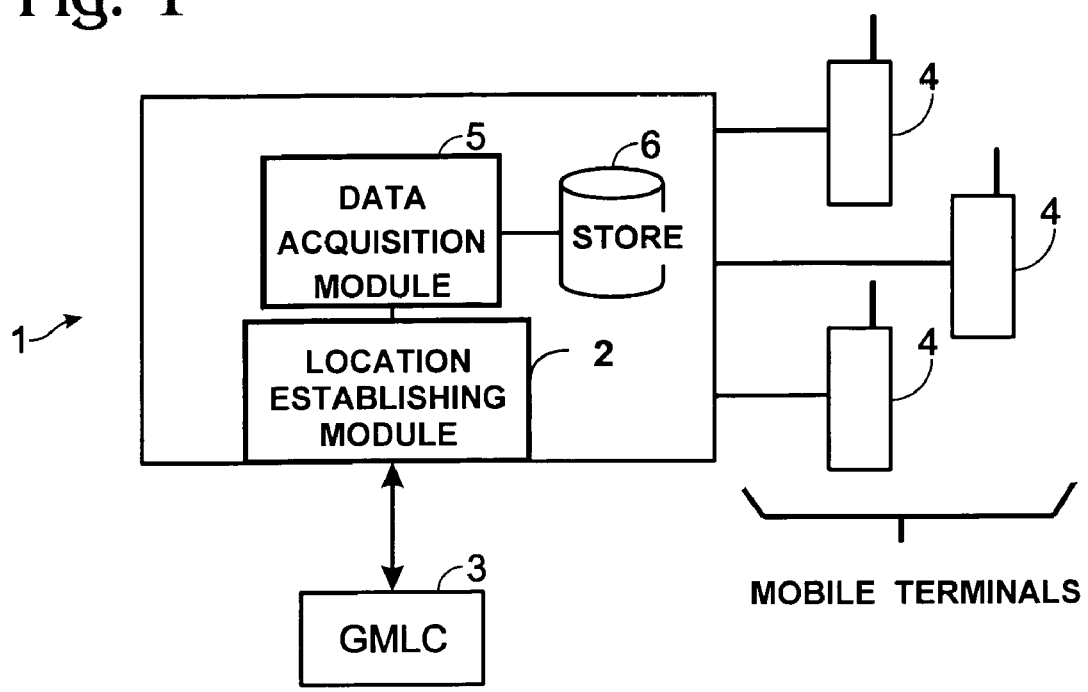
FIG. 1 is a schematic representation of a location based information system embodying the present invention together with telecommunication network components and mobile terminals.

The main components of a location based information system 1 embodying the present invention is shown in FIG. 1 and comprises:

a location establishing module 2 for polling a GMLC (Gateway Mobile Location Centre) 3 resource of the network to establish the location of the mobile terminal 4 within the network;

a data acquisition module 5 to build an historical profile of the user that can be used for further generation of service. The collection of historical data is limited in time to the period of a week, after which it is not necessary to poll for the mobile terminal location since activity of the subscriber in the next week will be assumed to be broadly a repetition of the previous week's activity; and a store 6 of historical data comprising a series of time-logged either actual X-Y co-ordinates or Cell-locations determined by Cell Id. This information can be categorised into segments where the determined location is changing indicating movement or activity and segments where the determined location is constant indicating lack of movement or rest. The categorisation allows a level of abstraction which can be used by the prediction to adjust variations.

In the preferred embodiment of the invention, the first step in the process is triggered by a subscriber signing up to the service. A data acquisition mode is entered. Initially, the location based information system will poll the network for mobile terminal/subscriber location to build a profile. A staged sign-up of subscribers to the service is important since it can be used as a tool to regulate the network load ensuring that the location of not too many subscribers is being polled. This is under the assumption that the sign-up will not be system wide, but that the subscribers will trickle through as they are subscribing to a new service.

The location data is collected from various sources, but is most likely to be a GMLC or similar network component offering substantially real time network based mobile terminal location information. In the data acquisition mode, the GMLC is polled by the location based information system 1 on a regular basis every 5 to 10 minutes. This allows for a set of location points which can be interpolated to determine path and direction of travel. Data can also be collected from the mobile terminal 4 directly, either from a SIM card of the mobile terminal uploaded using a SMS message to collect a history of the cell information for a phone or collected as global positioning system (GPS) co-ordinates from a A-GPS on the mobile terminal of the mobile terminal using an application running on the mobile terminal. Either of these are potentials for data collection.

The collected location information is readily converted to travel-on-road information. The step of reverse geocoding maps even inaccurate location data such as Cell Id to travel-on-road information. Based on the actual road traveled it is possible to refine the application logic.

Data collection can be further enhanced by the subscriber providing some of the information which would normally need to be collected from the network. This may be done directly by the user entering the data into the system using Web/WAP or indirectly by customer care during a sign-up process. The information collected by this means could be postcode or street address of home, postcode or street address of work, preference for mode of transport: train, bus or car/private transportation. Customer care could automatically add the postcode of the billing address which is likely to be either the home address or the work place.

The location profile is generated from the collected data and may comprise, in its simplest form, just pure time and location information. However, as will be appreciated by the references above to geocoding and travel-on-road information, a greater level of sophistication can be accorded to the location profile to include not just the location information but the road on which a subscriber is travelling and the subscriber's likely destination when travelling at any particular time. Preferably, the location profile is divided into time segments within each of which the mobile terminal is located in a recorded location or travelling between recorded locations on a recorded route.

After the data has been collected, the location profile generated and stored in the location profile store 6, the system can switch over (usually after a one week recordal of location information) for that mobile terminal to a prediction mode. The prediction mode is intended to reduce the load on the network by making it unnecessary to poll the network for periodic update of the subscriber location—that information is garnered from the stored location profile.

In the prediction mode, historical data of the subscribers' normal routine typically including locations and durations of stationary positions (home or work), route, time and direction of commute travel is referred to by the location based information system.

Using these segments of information from the location profile it is possible to build up an image of where the subscriber is likely to be at any given time. The prediction is driven by the analytical components of the historical data. A typical profile would consist of home, work and commuting route. Each segment would have to/from times associated with it which is used to generate the image of the expected location of the subscriber.

The generation of the location image can be further enhanced by the verification process, identifying exceptions such as leaving earlier than normal from work. This means that the prediction layer needs to provide an interface which can accept an update from verification and reset the generation of the location image.

The implementation of prediction can be a simple propagation based on the historical information. Alternative technologies such as spatial indexing where time is part of the index, neural networks and rule based programming are also available as tools for improving the location predictions and refining the location profile.

From time to time it will be necessary to rebuild the location profile of a given subscriber. Their habits, job, travel mode or home may change. The most optimal implementation would be when such a change is detected by the validation process executed by the system or flagged by a subscriber, an initial process is restarted similar to the initial sign up and a new location profile is built from scratch, initially with reference to the location determined by polling the network for mobile location information.

The prediction mode is not sufficiently accurate to make a meaningful service in itself for all applications and validation of the predicted location is an additional step to improve and drive the prediction thereby enhancing the quality of the location data which can be obtained without actively accessing the network.

The validation process is passive so as to be compatible with the design goal of minimal network overhead. The verification method is network dependent, and different network operators can allow different integration so different methods may be used in different developments. Accordingly, the validation process therefore needs to be separate from the method of acquiring the verification data. The verification process takes known location information and compares it to the position predicted from the location profile. There are three outcomes of the verification process: the known location matches the predicted location; the known location does not match the predicted location, but matches a different location held in the location profile meaning that the prediction time parameter needs to be reset to match the known location; or the predicted location does not match any locations in the location profile in which case special action needs to be taken.

The special action in case of a no-match scenario can depend on operator preference, available verification method and application requirements. Some of the possibilities are: further data collection to obtain new data—parameters could be set to collect data for a limited period (a few hours), or until the subscriber is back in a recognised normal segment; or disable the prediction mode and only use the verification process to drive the location updates of the subscriber.

The verification process allows the location based information system to provide location information even when the users are outside their normal routine. The strategy of obtaining location information in these exceptional circumstances has implications for the overall network load. The specific load acceptable is dependant on the application type and the target market for the application. It is clear that the verification process enhances the accuracy of location information.

Four different methods have been identified as passive or low overhead methods of verification. Each method relies on listening to the network traffic between base stations and the switching centre, or by distributing small parts of the logic to the mobile terminal with the view to have the mobile terminal communicate the exceptions or segment start/stop as they are observed by the mobile terminal. Each of the verification methods may have drawbacks or in exceptional circumstances may not be feasible for particular networks. Additional verification methods may of course be apparent to the skilled person.

1) In a traditional 2G GSM network the individual base stations connect to a Base Station Controller which handles cell-handover for a limited area. The Base Station Controllers (BSC) are connected to the Mobile Switching Centre (MSC) which handles all communication between BSCs and to the external network. The Cell Id of a subscriber is mapped to an X-Y position of a base station. The majority of the time, the Cell Id is only known to the BSC and cell-handovers are not communicated to the MSC which would allow their central collection for verification. It is, however, standard procedure for the BSC to make a house-keeping communication to the MSC every 10 to 60 minutes, which means that this message could be sniffed and used for verification purposes.

2) The CAMEL protocol is a continuation of the Intelligent Network protocol which enabled the birth of Prepay Systems and other routing and charging functions which are beyond traditional network switching. As part of this network architecture a Service Control Function (SCF) has the ability of notifying an application when the Mobile Phone Status changes. The SCF is relatively new as a standard function in the network, and its use as a verification tool may not be feasible for any of the following reasons: a particular network may not have a SCF; the SCF function may not be able to scale to the capacity required by examples of the invention; the SCF may create network traffic polling which will increase acceptable bandwidth usage and hence the network overhead.

3) SIM Tool Kit is a technology which has been available as a specialist tool for some time. Recently SIM Tool Kit providers have included Java solutions which mean that standard programmer skills can be used to build applications. An application on the Sim-Card (Java or not) has access to mobile terminal information such as time, date and Cell Ids. The Sim Application also has access to SMS as a communication for both sending and receiving data. With an application on the SIM it is possible to download the segments of the prediction using SMS. The Application can then locally validate the Cell Id with the prediction schedule and, if found to be an exception, an SMS can be used to communicate the exception back for validation. It should be noted that the SIM Tool Kit solution does require filters, so as to avoid a flood of SMS messages in areas of unpredictable coverage where the Cell Ids can jump from cell to cell for short periods of time.

4) Many new phones are equipped with both A-GPS chips and an application execution environment (Java or other)—this will be especially likely for high end phones with GPRS or 3G networks. This allows for an application to execute on the phone which matches the prediction with the actual position. On a 3G network an IP protocol can be used to communication any exception back for validation, and the validation process can instruct the phone by return message to make a contiguous reporting of location.

In the absence of access to one of the above passive or low network overhead solutions for verification information, it is possible to have a fall back solution comprising polling at a reduced sample rate frequency of the GMLC. This is a less preferred option. The verification process would in this scenario differ from the data collection by the frequency of obtaining the subscriber location. The process would work as follows: each hour the subscriber location would be inquired via the GMLC; if the subscriber location is found to be outside the segments prescribed by the location profile, a task is created to poll for the subscriber location every 5 minutes for the next 2 hours. The GMLC verification process will however significantly hinder scalability, as shown in the following calculation: assuming that a GMLC can handle up to 100 transactions per second and that 10% of all GMLC cycles have to be used for data collection or historical prediction data, that 20% of all GMLC cycles have to be used by people stepping outside their normal segments and that the remaining 70% of bandwidth can be used for verification. That would then support: 3600*70=252,000 subscribers verified each hour, 600*20=12,000 subscriber being outside their normal zones.

The verification process means that the quality of the data is improved from simple prediction to some level of real time verification against known sources of data within the network. The verification process also measures the frequency of exceptions generated and, if needed, can take a decision to request data collection to regenerate the profile of a particular user if the exception frequency exceeds a predetermined threshold.

Figure 2:
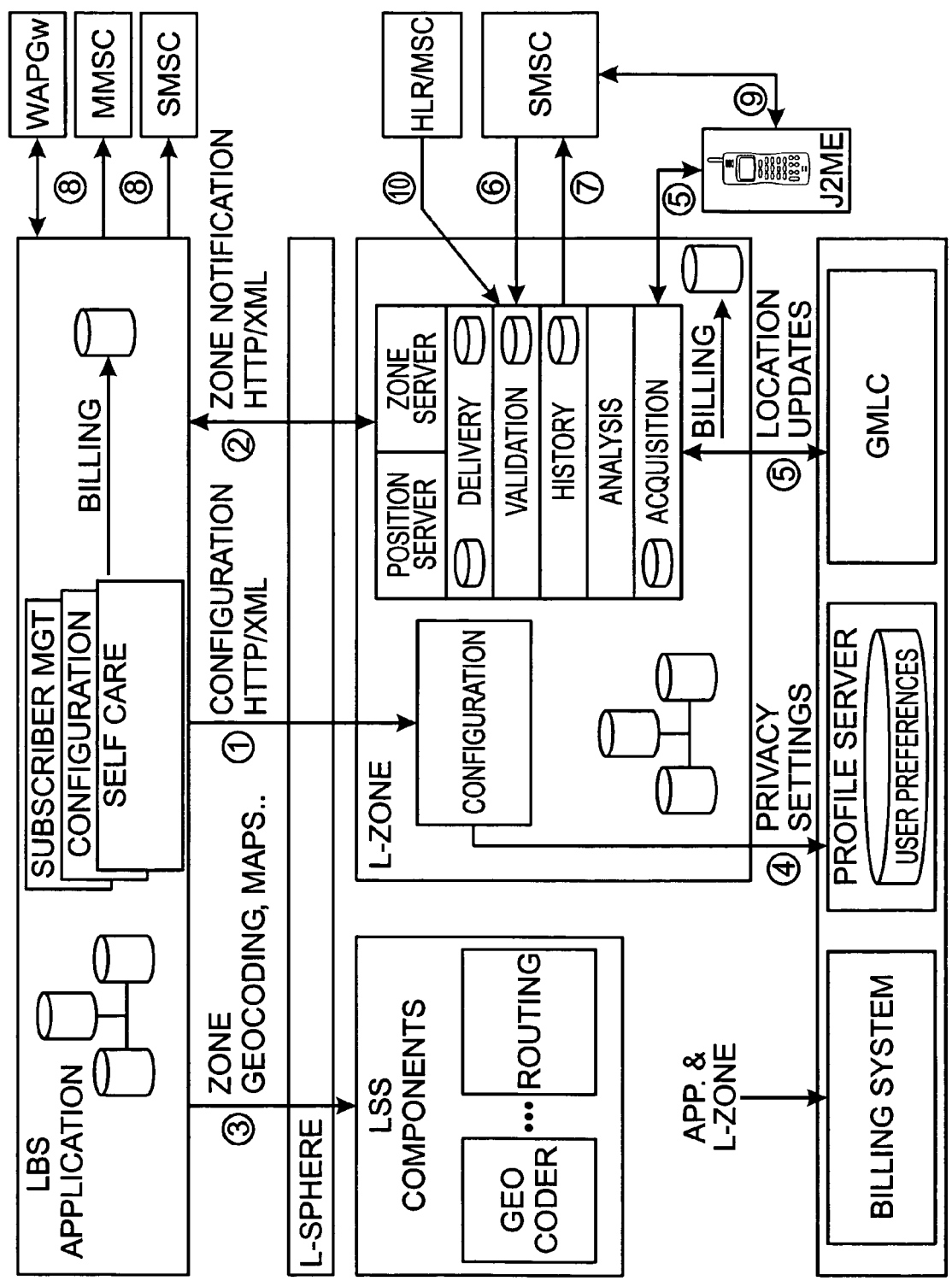
FIG. 2 is a schematic overview of the architecture of a location based information system embodying the present invention and its integration with other components of a cellular communications network.

As shown in FIG. 2, the north side of the application has two primary interfaces for distribution of information. The interfaces are implemented in an internet friendly format using XML or WebServices as the interface technology. One of the services is a standard GMLC-MLP interface which allows the system embodying the present invention to look and feel like a GMLC, but without the overhead of the GMLC having to access the radio network for actual location determination.

Examples of the present invention also allow the use of Zone Event Notification. This is used for applications which monitor when users enter and leave predetermined zones. The application declares the subscribers and zones at the point of initialisation. The application does this by a simple interface which creates zones and subscribers and establishes a relationship between them. An example of a Zone Event Notification application is Friend Alert which establishes the relation in the following steps:

initially the Friend Alert application has configuration data, for each subscriber, his friend-zones and his friends. The intent is that whenever the subscriber is in a particular locality, he would like to meet up with any of his friends;

the Friend Alert function initially creates the zone and the subscribers' identity and relates the two;

the location based information system checks the initial status and, if the subscriber is already within the zone, an alert is generated immediately. Otherwise an alert is not generated until the subscriber moves into the zone;

once the alert is received that subscriber is in the zone, the list of friends is loaded into the location based information system, and each friend is checked if they are in the same zone. If one or more is in the zone, an alert is raised to the application which then can decide on sending an appropriate message to the subscribers;

once the subscriber moves out of the zone, the friend list is removed from the zone.

Zone query allows information applications to send out information relevant for a particular zone. A shop can efficiently promote a special deal for the next 10 customers, simply by targeting only customers who are in the vicinity. Traffic information would work in a similar manner, sending road and accident information only to the people for whom it would be relevant. Such applications would use the interface in the following way:

Each application would have a list of subscribers who had signed up for the service.

At the time of the event, the application would request a list of all subscribers within 500 meters of a given X-Y position. The response would contain all the subscribers who had signed up to a service and who are believed to be within the given area.

The application would match the list against its own list of subscribers, and provide each of the subscribers within the service the promised information.

Other interfaces will be defined for the query of:
Query Subscribers currently on road-X
Query Subscribers going to enter Zone.
Query Subscribers going to be on Road-X It is possible to deduce how these interfaces will be implemented from the prediction engine.

FIG. 2 offers a more detailed schematic overview than FIG. 1 of the architecture of the location based information system and its integration with the other components of a cellular communications network.

There are the following network interfaces from the location based information system:

LIF and MPL connect to the GMLC (or equivalent)

SMPP connect to the SMSC for sending and receiving SMS.

WAP/WEB interface for confirmation and configuration of the system

MAP (sniffer) interface for collecting cell-handover information from the SS network CAMEL-SCF interface for collecting Cell Id information from the network LDAP interface for connecting to the Profile Server for Privacy Settings.

In the present specification "comprises" means "includes or consists of" and "comprising" means "including or consisting of".

The invention claimed is:

1. A method of providing location based information to a mobile terminal within a communications network comprising the steps of:
   interrogating a component of the communications network to determine the location of a mobile terminal within the communications network;
   repeating the above process a number of times over a data acquisition period;
   generating, from the repeated determinations of the location of the mobile terminal within the communications network, a location profile of time-logged locations for the mobile terminal wherein the location profile of time-logged locations includes segments, and wherein each segment comprises a series of time-logged locations;
   storing the location profile of time-logged locations remotely of the mobile terminal; and
   providing location based information to the mobile terminal, during a data prediction period which is subsequent to the data acquisition period, in response to the location of the mobile terminal predicted by using the stored location profile of time-logged locations, wherein the mobile terminal
      determines its position independently of the location of the mobile terminal predicted by using the stored location profile of time-logged locations,
      downloads segments of the location profile of time-logged locations to thereby acquire the predicted location stored remotely from the mobile terminal, and
      compares the independently determined position and the predicted location to validate the location predicted by using the stored location profile of time-logged locations; and
   wherein if the predicted location of the mobile terminal is not validated, then an exception is declared and if the number of exceptions is greater than a predetermined threshold number, then at least a part of the location profile of time-logged locations is regenerated.

2. A method according to claim 1, wherein the component of the communications network is a GMLC (Gateway Mobile Location Centre).

3. A method according to claim 1, wherein the communications network is a cellular communications network and the mobile terminal determines its position with reference to a Cell Id of the cell in the network within which the mobile terminal is located.

4. A method according to claim 1, wherein the mobile terminal is enabled with a satellite positioning system to determine its own position.

5. A method according to claim 1, wherein a fresh location profile of time-logged locations is established for the mobile terminal upon request.

6. A method according to claim 1, wherein a fresh location profile of time-logged locations is established for the mobile terminal after a predetermined time period.

7. A method according to claim 1, wherein use of the stored location profile of time-logged locations mimics interrogation of the component of the communications network used to determine the location of a mobile terminal within the communications network.

8. A method according to claim 1, wherein the location based information is pushed to the mobile terminal.

9. A method according to claim 1, wherein the location based information comprises a location based service.

10. A method according to claim 1, wherein the stored location profile of time-logged locations contains location information for the mobile terminal over a set time period.

11. A method according to claim 1, wherein analysis techniques are used on the location information to enhance the location profile of time-logged locations.

* * * * *